(12) United States Patent
Ha

(10) Patent No.: US 12,011,988 B2
(45) Date of Patent: Jun. 18, 2024

(54) AIR DAMPER DEVICE

(71) Applicant: HBPO GmbH, Lippstadt (DE)

(72) Inventor: Insoo Ha, Erwitte (DE)

(73) Assignee: HBPO GmbH, Munich (DE)

( * ) Notice: Subject to any disclaimer, the term of this patent is extended or adjusted under 35 U.S.C. 154(b) by 46 days.

(21) Appl. No.: 17/693,757

(22) Filed: Mar. 14, 2022

(65) Prior Publication Data

US 2022/0289019 A1    Sep. 15, 2022

(51) Int. Cl.
*B60K 11/08* (2006.01)
*B60Q 9/00* (2006.01)

(52) U.S. Cl.
CPC .............. *B60K 11/085* (2013.01); *B60Q 9/00* (2013.01)

(58) Field of Classification Search
CPC .... B60K 11/085; B60Q 9/00; B60Y 2306/15; B60Y 2400/305; B60Y 2410/102
See application file for complete search history.

(56) References Cited

U.S. PATENT DOCUMENTS

| | | | |
|---|---|---|---|
| 6,302,633 B1 * | 10/2001 | Poe | F16B 37/00 411/432 |
| 8,903,599 B2 * | 12/2014 | Sato | B60H 1/00871 123/41.07 |
| 10,322,664 B2 | 6/2019 | Dill | |
| 10,391,855 B2 | 8/2019 | Brueckner | |
| 10,578,336 B2 | 3/2020 | Schneider et al. | |
| 2002/0056231 A1 * | 5/2002 | Blachley | E06B 7/086 49/87.1 |
| 2013/0184943 A1 * | 7/2013 | Sato | G06F 17/00 701/49 |
| 2013/0338870 A1 * | 12/2013 | Farmer | B60K 11/085 701/29.2 |

(Continued)

FOREIGN PATENT DOCUMENTS

| | | |
|---|---|---|
| DE | 4336905 C1 | 3/1995 |
| DE | 102014117817 A1 | 6/2016 |

(Continued)

OTHER PUBLICATIONS

German Patent Application 10 2021 106 115.6; Applicant: HBPO GmbH; Office Action dated Mar. 29, 2023; 10 pages.

*Primary Examiner* — Kurt Philip Liethen
(74) *Attorney, Agent, or Firm* — Thorpe North & Western, LLP

(57) ABSTRACT

An air flap device for use in a motor vehicle can have an air flap unit comprising a plurality of air flaps pivotally supported about an axis of rotation between a closed position and an open position, wherein the air flaps each have a cover section for covering and uncovering air passages and a fastening section for fixing the air flaps in the air flap device, a drive unit for driving the air flaps, a control unit for controlling an operational capability of the air flaps the control unit having corresponding receiving sections for receiving the fastening sections of the individual air flaps, the air flap device being configured in such a way that a detectable force is generated in the event of a malfunction or non-function of an air flap, wherein the detectable force results from a direct interaction between the fastening section of at least one air flap and the corresponding receiving section of the air flap in the control unit.

19 Claims, 10 Drawing Sheets

(56) References Cited

U.S. PATENT DOCUMENTS

| | | | | |
|---|---|---|---|---|
| 2014/0005897 | A1* | 1/2014 | Hayakawa | B60K 11/085 |
| | | | | 701/49 |
| 2014/0129078 | A1* | 5/2014 | Jeong | G05B 23/0275 |
| | | | | 701/32.8 |
| 2016/0348709 | A1* | 12/2016 | Staniszewski | F16B 33/006 |
| 2017/0120743 | A1* | 5/2017 | Dudar | B60K 11/085 |

FOREIGN PATENT DOCUMENTS

| | | |
|---|---|---|
| DE | 102015201076 A1 | 7/2016 |
| DE | 102017215989 A1 | 3/2019 |
| DE | 102018124572 A1 | 4/2020 |

* cited by examiner

AIR DAMPER DEVICE

RELATED APPLICATION

This application claims priority to German Patent Application No. 10-2021106115.6, filed Mar. 12, 2021 which is incorporated herein by reference.

BACKGROUND

In modern vehicles, especially motor vehicles, air flap devices are usually used to influence the cooling of the engine. The air flap devices are arranged in the area of the vehicle front, e.g. on the radiator grille, and can be moved between an open and a closed position. In this way, the use of the air flap devices, for example during a cold start of the engine, can prevent the inflow of fresh air into the engine compartment by placing the air flap devices in the closed position during this time. This allows the engine to be quickly brought up to the required operating temperature. When a vehicle is in operation, the air flap devices can then be moved to the open position as required to supply fresh air to the engine for cooling purposes. In order not to adversely affect the fuel consumption of a vehicle, known air flap devices are configured to be aerodynamically optimized and feature a plurality of movable blades for opening and closing air passages.

Subsequently, such lamella-operated air flap devices are susceptible to damage. Since even damage to a single blade leads to a considerable deterioration in the optimized aerodynamics and therefore to a significant increase in fuel consumption, today's blade-operated air flap devices must, for environmental reasons, be equipped with a diagnostic system that reliably diagnoses even damage to a single blade and reports this to the driver of a vehicle. Although lamella-operated air flap devices with diagnostic systems are known from the prior art, the diagnostic systems of these known air flap devices are either not configured to reliably diagnose damage to a single lamella, or the air flap devices are so complex in design that rapid and cost-effective manufacture of the air flap devices is not possible.

SUMMARY

The present invention relates to an air flap device for use in a motor vehicle and a method for controlling an air flap device. The present invention can at least partially remedy the above-mentioned drawbacks of known lamella-operated air flap devices. In particular, the invention can provide a lamella-operated air flap device which can reliably diagnose the damage of a single lamella and at the same time can be manufactured in a structurally simple and cost-effective manner.

The foregoing problem can be solved by a device having the features of the independent device claim and by a method according to the features of the independent method claim. Further features and details of the invention result from the dependent claims, the description, and the drawings. Features and details described in connection with the device according to the invention are of course also valid in connection with the method according to the invention and vice versa, so that with regard to the disclosure of the individual aspects of the invention reference is or can always be made mutually.

According to the invention, an air flap device with an air flap unit for use in a motor vehicle is provided. In this case, the air flap unit of the air flap device comprises a plurality of air flaps which are pivotally supported about an axis of rotation between a closed position and an open position, the air flaps each having a cover section for covering and uncovering air passages and a fastening section for mounting the air flaps in the air flap device, a drive unit for driving the air flaps, a control unit for controlling an operability of the air flaps, the control unit having corresponding receiving sections for receiving the fastening sections of the individual air flaps, the air flap device being configured such that a detectable force is generated in the event of a malfunction or a non-function of an air flap, the detectable force resulting from a direct interaction between the fastening section of at least one air flap and the corresponding receiving section of the air flap in the control unit.

The present air flap device for use in a motor vehicle can be arranged in the front area of a motor vehicle, in particular between a radiator grille or a front hood and a motor vehicle cooling module. In addition to being used in passenger cars and trucks, the device according to the invention can likewise be used in other motorized vehicles, such as ships or flying objects or the like. Optionally, an opening process and a closing process can be driven by the present drive element and controlled, for example, by means of a higher-level control unit. The air flap device in question can have two air flap units, which are arranged next to one another and are connected to one another centrally, for example via a coupling element, such as a coupling rod or the like. An air flap unit can have at least three, and in some cases more than three, air flaps, which can be arranged one above the other, in particular parallel to their axis of rotation. In the open position of the air flap device, air can enter the air passages, whereas in the closed position the air passages are at least partially, or completely, closed. When the air flap device is arranged in a front area of a motor vehicle, it is thus possible to ventilate the front area as desired.

According to the invention, a malfunction or non-function of an air flap can be understood to mean that an air flap can no longer perform its function, or can no longer perform its function as intended. Thus, a malfunctioning or non-functioning air flap can, for example, be understood as an air flap that can no longer move or no longer move completely or only partially or only by increased force influence between an open position and a closed position. The cause of such a malfunction or non-function can be, for example, an accident or a stone impact or the like, as a result of which, for example, a part of the air flap can be separated. In the context of the invention, a detectable force may be understood to mean, in particular, a friction or frictional force acting between the fastening section of at least one air flap and a corresponding receiving section of the control device. The increased friction or frictional force can be caused in particular by the malfunction or non-function of an air flap, in that the malfunction or non-function causes, for example, a blockage, tilting or jamming between the fastening section of at least one air flap and a corresponding receiving section of the control device. The detectable force can thereby be detected via a torque that is necessary for driving the malfunctioning air flap or all air flaps between a closed position and an open position. The detectable force can thereby be detected, for example, via a sufficient current or voltage for a drive. In the context of the invention, a direct interaction can be understood in particular as being limited to the location at which the detectable force is generated, namely between the fastening section of at least one air flap and the corresponding receiving section of the air flap in the control unit.

Within the scope of the invention it has been recognized that by the introduction of specifically configured fastening sections of air flaps and the introduction of a control element with corresponding receiving sections for receiving the fastening sections, a reliable detection of a malfunction or a non-function of already one single air flap of an air flap device for use in a motor vehicle can be ensured in a structurally simple manner. The detection enables an early warning to be given to the driver of the motor vehicle, which is already prescribed by the authorities in many countries, who can then initiate appropriate measures to rectify the damage as quickly as possible. In particular, this reduces or minimizes the distance a vehicle has to travel with increased fuel consumption, thus protecting the environment. Due to the variety of possible designs of the fastening sections of the air flaps or the corresponding receiving sections of the control unit, it is also possible to individually adapt the detectable force via which a malfunction or non-function of an air flap is registered to the corresponding air flap device.

With regard to a constructively simple possibility of generating a detectable force for reliable detection of a malfunction or non-function of an air flap, it can be advantageously provided in accordance with the invention that the air flap device is configured in such a way that the air flaps exert a simultaneous movement along the axis of rotation during a movement from the closed position into the open position or vice versa, the generation of the detectable force in the event of a malfunction or non-function of an air flap resulting from a restricted movability of at least one air flap along the axis of rotation. Here, in particular, the fastening section of a malfunctioning or non-functioning air flap can be restricted in its movability during a movement of an air flap device from the closed position to the open position or vice versa and, for example, remain in its position. A simultaneous movement in the direction of the axis of rotation during a movement from the closed position to the open position or vice versa can be achieved in particular in the form of a forced movement, which can be forced, for example, by an engagement of the fastening section of the air flaps in a corresponding receiving section of the control unit, for example via correspondingly configured outer and inner profiles of the fastening sections or the receiving sections.

For the purpose of cost minimization and component minimization, it can be advantageously provided within the scope of a structurally simple design of the air flap device in question that the detectable force can be detected by means of the drive unit, the detectable force preferably being detectable via the force required by the drive unit for driving the air flaps. The drive unit can here be formed in the form of an actuator, which can in particular also be provided for driving the air flap device, i.e. for adjusting the air flaps between an open position and a closed position. In this way, there is no need for additional sensors or sensing devices to detect a detectable force, which is not only advantageous for cost reasons, but can also be beneficial in terms of required maintenance intervals or susceptibility to failure.

In the context of a structurally simple and easily repairable design of the present air flap device, it is also conceivable that the cover section of the air flaps has a lamella and a lamella carrier, the lamella preferably having a first and a second lamella section, which are separated from one another in the longitudinal direction by the lamella carrier. In this case, the lamella can, for example, be inserted into the lamella carrier and then fastened thereto. It is also conceivable that the air flaps are formed in one piece and the blades have, for example, an integrated carrier or an integrated shaft.

Within the scope of a constructively simple and easily modifiable design of the present air flap device, optionally the fastening section can have a guide pin for insertion into an inlet opening of the control unit, the guide pin being arranged terminally on an air flap. The guide pin can be of essentially cylindrical design, optionally corresponding in shape to a corresponding receiving section of the control unit.

In order to generate a specifically adaptable detectable force, it can be provided in particular that the guide pin has a profiled surface, the profiled surface optionally being in the form of an external thread. By means of a profiled surface or a thread, it is possible during a movement from the closed position to the open position or vice versa, in particular, to execute a simultaneous movement in the direction of the axis of rotation of an air flap in order to be able to detect a malfunction or non-function of an air flap in a targeted manner.

A wide variety of designs of the external thread of the guide pin are conceivable consistent with this description. For example, the external thread can be in the form of one of the following thread types: trapezoidal thread, fine thread, pointed thread, Whitworth thread, saw thread, round thread, flat thread, left-hand thread, UNC thread or UNF thread.

In the context of simple and inexpensive manufacture with the simultaneous implementation of individual adaptability of a detectable force, it can be advantageously provided that the control unit is configured in several parts (multipart design), the control unit having a base unit for receiving the fastening section of the air flaps and an outer frame element for protecting the control unit. The outer frame element can, for example, be formed from a plastic and can be arranged directly around the base unit. In this case, the frame element can be connected to the base unit in a form-fitting, force-fitting or material-locking manner. In the context of a positive connection, the base unit can, for example, have latching lugs and the frame element can have corresponding recesses, so that the base unit and the outer frame element can be detachably connected to one another in a simple manner. In particular, the present control unit can be arranged in an outer region of the present air flap device.

In one option, an air flap device according to the invention has two control units, which are arranged in particular in the outer regions of the air flap device, respectively. In this case, the control units can each be aligned perpendicularly to the alignment of the air flaps, so that each air flap can be connected to a respective receiving section of the control unit via a fastening section. The receiving sections of the control unit can have equidistant geometries for this purpose.

In order to ensure safe guidance and accommodation of the air flaps, it is also advantageous if the base unit has a guide element (30) with receiving sections (12.1) for accommodating the front parts of the guide pins of the air flaps, the shape of the receiving sections corresponding in shape to the shape of the front parts of the guide pins of the air flaps. Thus, the receiving sections can be at least partially hollow-cylindrical in shape and configured to receive cylindrically shaped front parts of the guide pins.

In the context of simple and cost-effective manufacture with the simultaneous possibility of individual adaptability of a detectable force, it can be further provided that the base unit has a locking element with receiving sections for receiving the rear parts of the guide pins of the air flaps. The locking element can advantageously be individually adapted to a profile of the guide pins in order to set a specific detectable force that can be specifically adapted to the air flap device in question in order to be able to reliably detect a malfunction or non-function of a single air flap. The locking element can be made of a plastic material, for example, and can be connected to the guide element in a form-fitting, force-fitting or material-locking manner.

For further individual adaptability of a detectable force, the locking element can have a plurality of inner frame parts for receiving the profiled surface of the guide pins, the inner frame parts can have an internal thread for correspondingly receiving an external thread of the guide pins. In such an embodiment, an individual adaptability of a detectable force can be achieved, for example, mainly or exclusively via the inner frame parts and the corresponding outer profiles or outer threads of the guide pins of the air flaps. All other parts of the control unit, such as the outer frame element and the guide element, can be manufactured without individual adaptation, which significantly minimizes the production effort and the associated costs.

Furthermore, with regard to individual adaptability of a detectable force, it is also considered that the locking element has a plurality of outer frame parts for receiving the inner frame parts, with an outer frame part preferably being assigned to each inner frame part. The locking element can advantageously be configured as a single piece and, for example, be made of a plastic.

In order to generate a detectable force between the fastening section of a loading flap and the receiving section of a control unit that is as high as possible or can be individually adjusted, it can be advantageously provided in accordance with the invention that the detectable force results at least in part from a direct interaction between an external thread of at least one air flap arranged in the fastening section on the guide pin and a corresponding internal thread of an inner frame part.

Alternatively or cumulatively, with regard to the highest possible or an individually adjustable detectable force between the fastening section of a loading flap and the receiving section of a control unit, it is considered that the detectable force results at least in part from a direct interaction between a receiving section of the guide element and a front part of a guide pin.

Alternatively or cumulatively, however, it may also be provided that the detectable force results at least in part from a direct interaction between at least one inner frame member and an outer frame member.

In order to be able to carry out a particularly targeted setting of a detectable force in a structurally simple manner, it can be advantageously provided that the level of the detectable force can be varied via the type of thread form of the external thread of the guide pin and/or the lead angle of the external thread and/or the diameter of the guide pin. For example, the coefficient of friction can be increased via higher lead angles of the external thread. By increasing the diameter of the guide pin, for example, higher flank angles can be achieved, which increases the translation (movement along the axis of rotation) of an air flap. In addition to the above-mentioned possibilities of varying the level of the detectable force via the type of thread form of the external thread of the guide pin and/or the lead angle of the external thread and/or the diameter of the guide pin, it is also possible to influence the detectable force by varying the materials used.

In addition to a fastening section for fastening the air flaps to a first side of an air flap device, the present air flap device may advantageously be configured such that the air flaps each have a coupling section for coupling to a coupling element, the coupling section optionally being arranged endwise and opposite the fastening section.

A method for controlling an air flap device of a motor vehicle, in particular an air flap device described above, can comprise the steps of driving an air flap device from an open position to a closed position or vice versa, detecting the force required for the movement during the movement in order to record a force-distance profile, comparing the recorded force-distance profile with a reference profile, detecting a malfunction or a non-function of an air flap of the air flap device on the basis of a deviation between the recorded force-distance profile and the reference profile, and transmitting a warning message to the motor vehicle.

Thus, the method according to the invention has the same advantages as have already been described in detail with respect to the air flap device according to the invention. The recorded deviation between the recorded force-distance profile and the reference profile can be caused in particular by an increased friction or frictional force resulting from a direct interaction between the fastening section of at least one air flap and the corresponding receiving section of the air flap in the control unit. The fastening section of a damaged air flap (air flap with malfunction or non-function) can—during a movement of the air flap device from a closed position to an open position or vice versa—in particular be restricted in its movement and, for example, remain in the corresponding receiving section and thereby generate the detectable force in the form of frictional force. This misbehavior can then be transmitted to the driver of the motor vehicle in the form of a warning message, for example from a control device or the like.

In order to be able to reliably detect the malfunction or non-function of a single air flap, it can be advantageously provided that when comparing the recorded force-distance profile with the reference profile, a deviation between the recorded force-distance profile and the reference profile of at least $2/10$ of the reference value is detected, whereby the reference profile preferably has a lower value. The detectable force can be greater than 0.1 Nm, particularly greater than 0.2 Nm, and in some cases between 0.2 and 0.3 Nm.

Also an object of the invention is further motor vehicle comprising an air flap device described above.

Further advantages, features and details of the invention will be apparent from the following description, in which embodiments of the invention are described in detail with reference to the drawings. In this connection, the features mentioned in the claims and in the description may each be considered part of the invention individually or in any combination.

Figure 1:
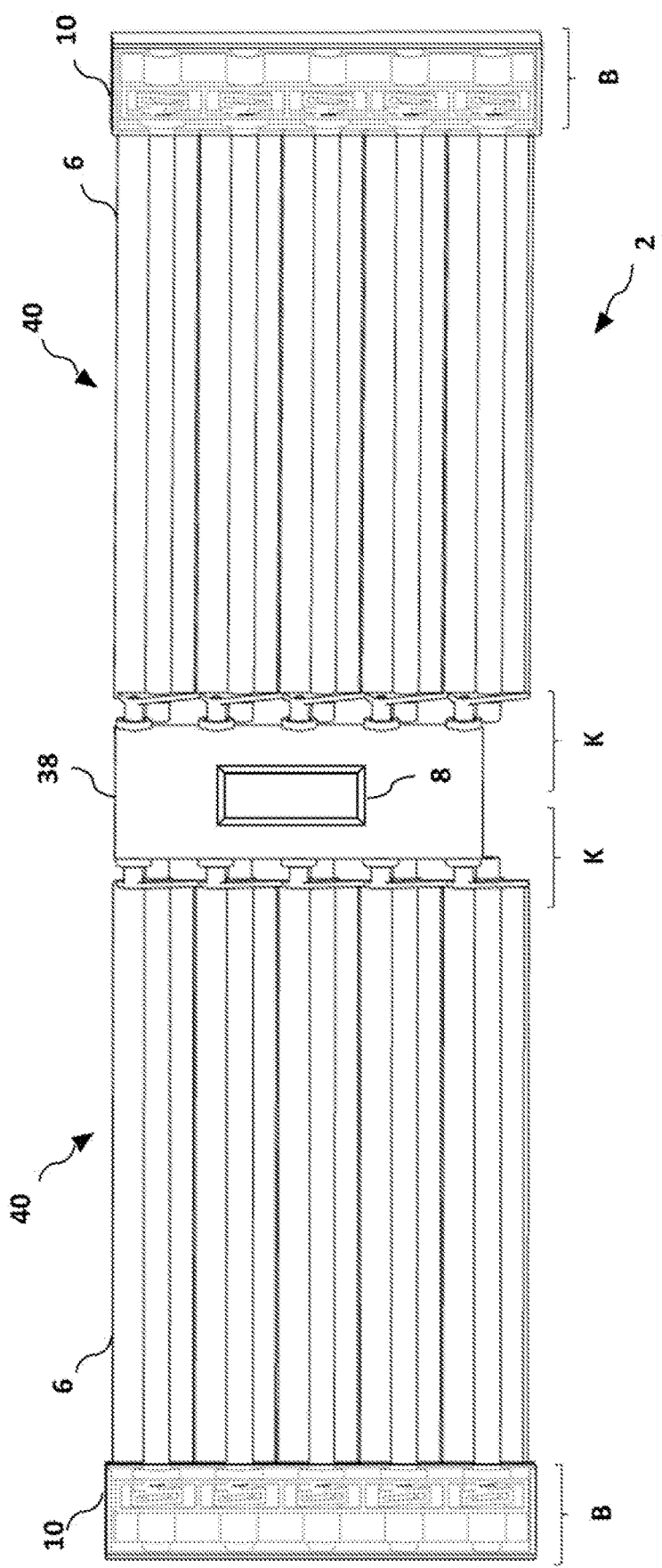
FIG. 1 is a schematic representation of an air flap device according to the invention for use in a motor vehicle according to a first embodiment.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a locking element" includes reference to one or more of such channels and reference to "pivoting" refers to one or more of such steps.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Example Embodiments

FIG. 1 shows a schematic representation of an air flap device 2 according to the invention for use in a motor vehicle in accordance with a first embodiment.

As can be seen in FIG. 1, the air flap device 2 in question comprises two air flap units 40 which are connected to one another via a coupling element 38. In this case, the air flap units 40 have a plurality of air flaps 6, each of which is arranged on a control unit 10 via a fastening section B. Opposite the fastening section B, the air flaps 6 are each connected to the coupling element 38 via a coupling section K. The air flaps 6 can be pivoted between an open position and a closed position via the drive unit 8 arranged on the coupling element 38.

Figure 2:
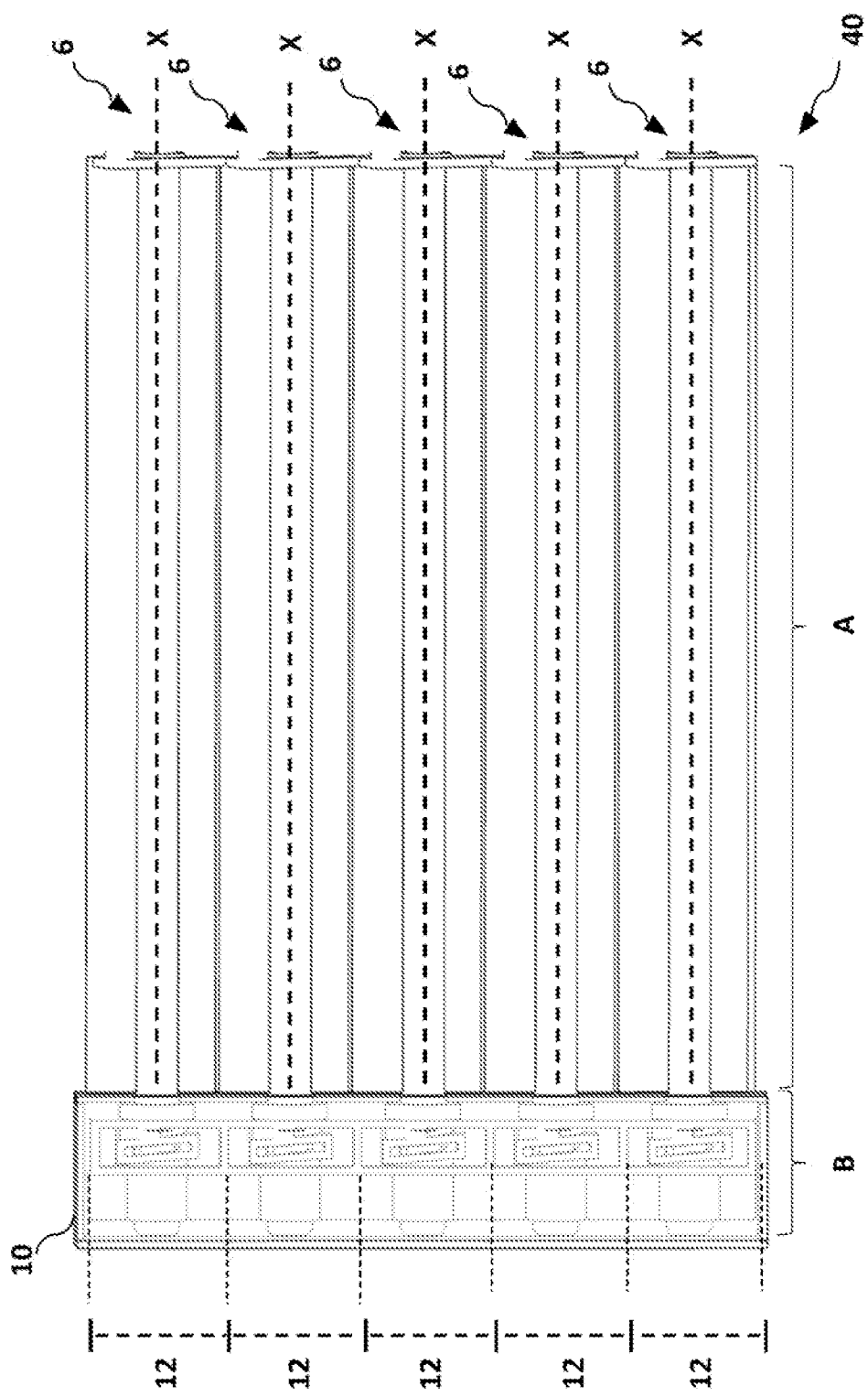
FIG. 2 is a schematic representation of an air flap unit of an air flap device according to the invention for use in a motor vehicle according to a first embodiment.

FIG. 2 shows a schematic representation of an air flap unit 40 of an air flap device 2 according to the invention for use in a motor vehicle according to a first embodiment.

As can be seen according to FIG. 2, each of the air flaps 6 of the air flap unit 40 has a respective cover section A for covering and uncovering air passages L and a fastening section B for fastening the air flaps 6 in the air flap device 2. In this case, the air flaps 6 can be pivoted about the axis of rotation X during a movement from a closed position to an open position and vice versa. The fastening section B of the air flaps 6 is—as can be seen here—arranged in the corresponding receiving sections 12 of the control unit 10. The air flap device 2 is configured in such a way that, in the event of a malfunction or non-function of an air flap 6 of an air flap unit 40, a detectable force F is generated, the detectable force F resulting from a direct interaction between the fastening section B of at least one air flap 6 and the corresponding receiving section 12 of the air flap 6 in the control unit 10. In this case, the detectable force F can be detected by means of the drive unit 8, the detectable force F being detectable in particular via the force required by the drive unit 8 for driving the air flaps 6.

Figure 3:
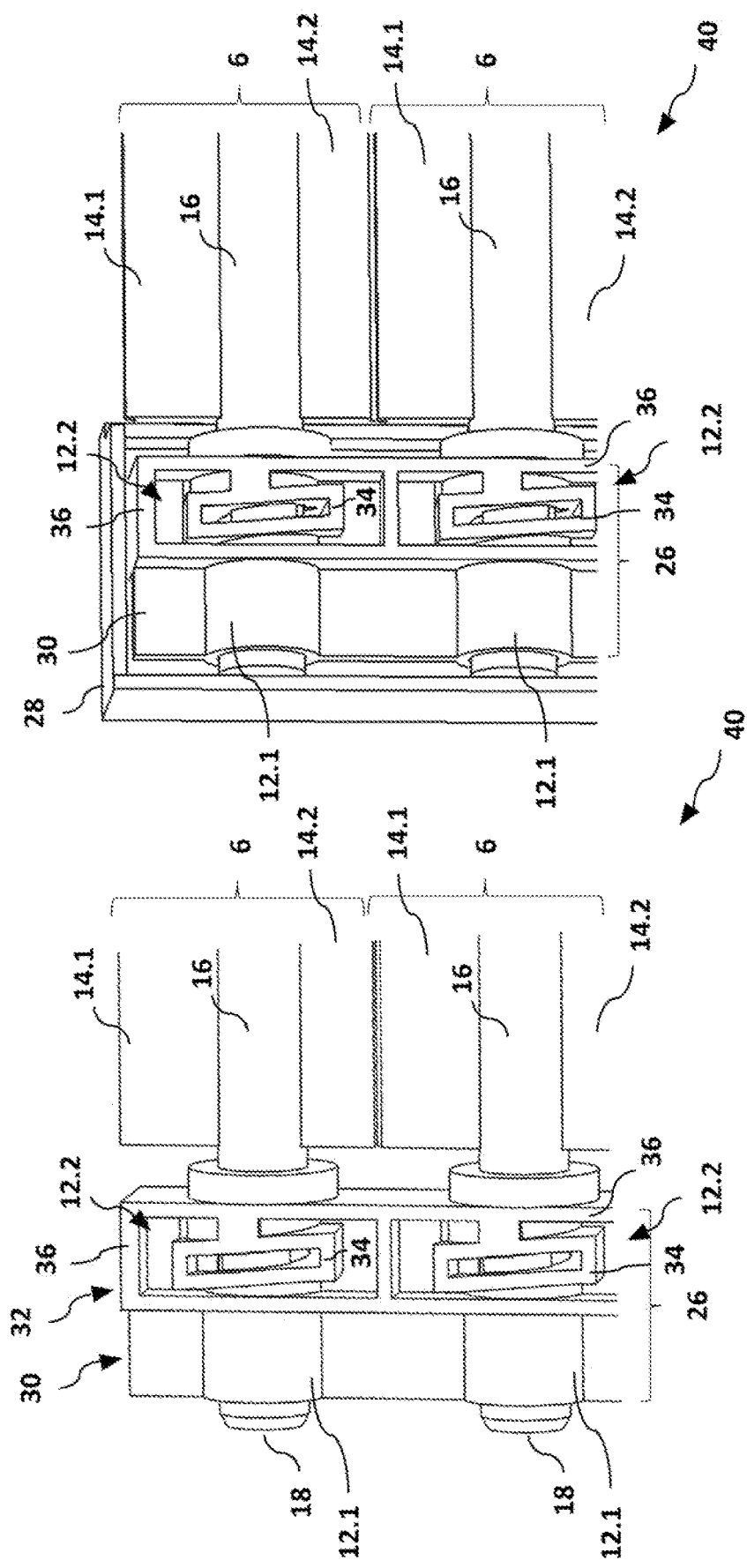
FIG. 3 is a schematic representation of a partial section of the air flap unit according to the invention as shown in FIG. 2 in a first and a second representation according to a first embodiment.

FIG. 3 shows a schematic representation of a partial section of the air flap unit 40 according to FIG. 2 in a first embodiment and a second embodiment according to a first embodiment.

As can be seen in FIG. 3, the control unit 10 is configured in several parts. In the illustration of the air flap unit 40 on the right-hand side, in contrast to the illustration on the left-hand side, the outer frame element 28 is additionally shown, which is provided in particular to protect the control unit 10. Otherwise, the two illustrations do not differ from each other. In addition to the outer frame element 28, the control unit 10 has a base unit 26, which is configured in particular to receive the fastening section B of the air flaps 6. In this case, the base unit 26 has a guide element 30 with receiving sections 12.1 for receiving the front parts of the guide pins 18 of the air flaps 6, the shape of the receiving sections 12.1 being configured to correspond in shape to the shape of the front parts of the guide pins 18 of the air flaps 6. Furthermore, the base unit 26 comprises a locking element 32 with receiving sections 12.2 for receiving the rear parts of the guide pins 18 of the air flaps 6. The locking element 32 further comprises a plurality of inner frame parts 34 and outer frame parts 36 for receiving the inner frame parts 34, wherein in the present case each inner frame part 34 is associated with an outer frame part 36. As can be seen in FIG. 3, the air flaps 6 are in the form of blades 14 and include a blade support 16 and first and second blade sections 14.1 and 14.2. Preferably, the air flaps or the lamellae are formed in one piece here. The detectable force F generated in the event of a malfunction or a non-function of an air flap 6 can here, for example, result at least in part from a direct interaction between a receiving section 12.1 of the guide element 30 and a front part of a guide pin 18. Similarly, the detectable force may result at least in part from a direct interaction between at least an inner frame part 34 and an outer frame part 36. Also, it is possible that the detectable force F results at least in part from a direct interaction between an external thread 24 (not detectable in the present case) of the fastening section B of at least one air flap 6 and a corresponding internal thread 34a (not detectable in the present case) of an inner frame member 34.

Figure 4:
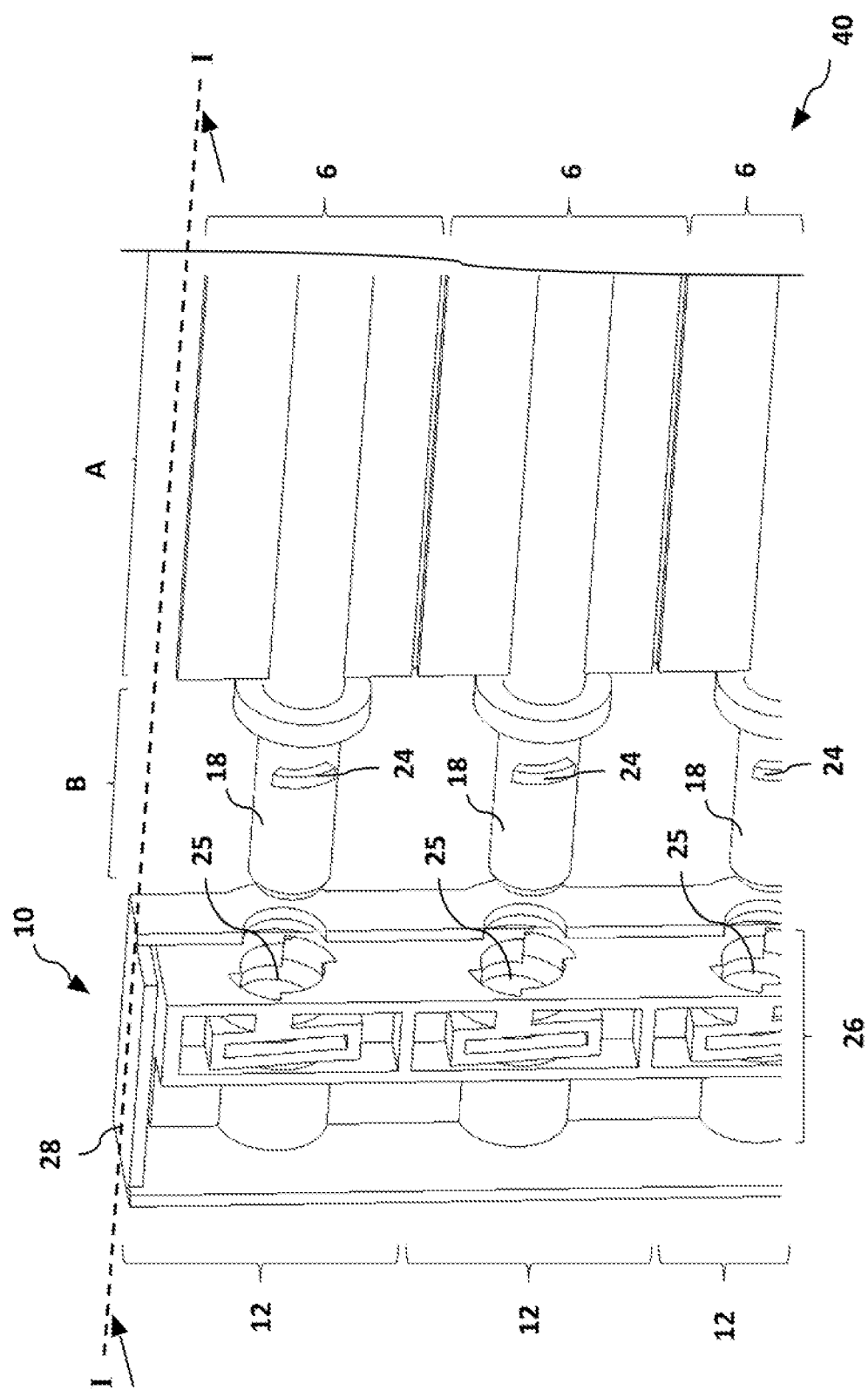
FIG. 4 is a schematic representation of a partial section of the air flap unit according to the invention as shown in FIG. 2 in an exploded view according to a first embodiment.

FIG. 4 shows a schematic representation of a partial section of the air flap unit according to the invention as shown in FIG. 2 in an exploded view according to a first embodiment.

As can be seen in FIG. 4, the fastening sections B of the air flaps 6 of the air flap unit 40 have a guide pin 18 for insertion into an inlet opening 25 of the control unit 10, the guide pin 18 being arranged in the present case at the end of the air flap 6. In the present case, the guide pin 18 also has a profiled surface which is in the form of an external thread 24. The external thread 24 can be formed here in the form of various thread types, for example in the form of a trapezoidal thread, a fine thread, a pointed thread, a saw thread or the like.

Figure 5:
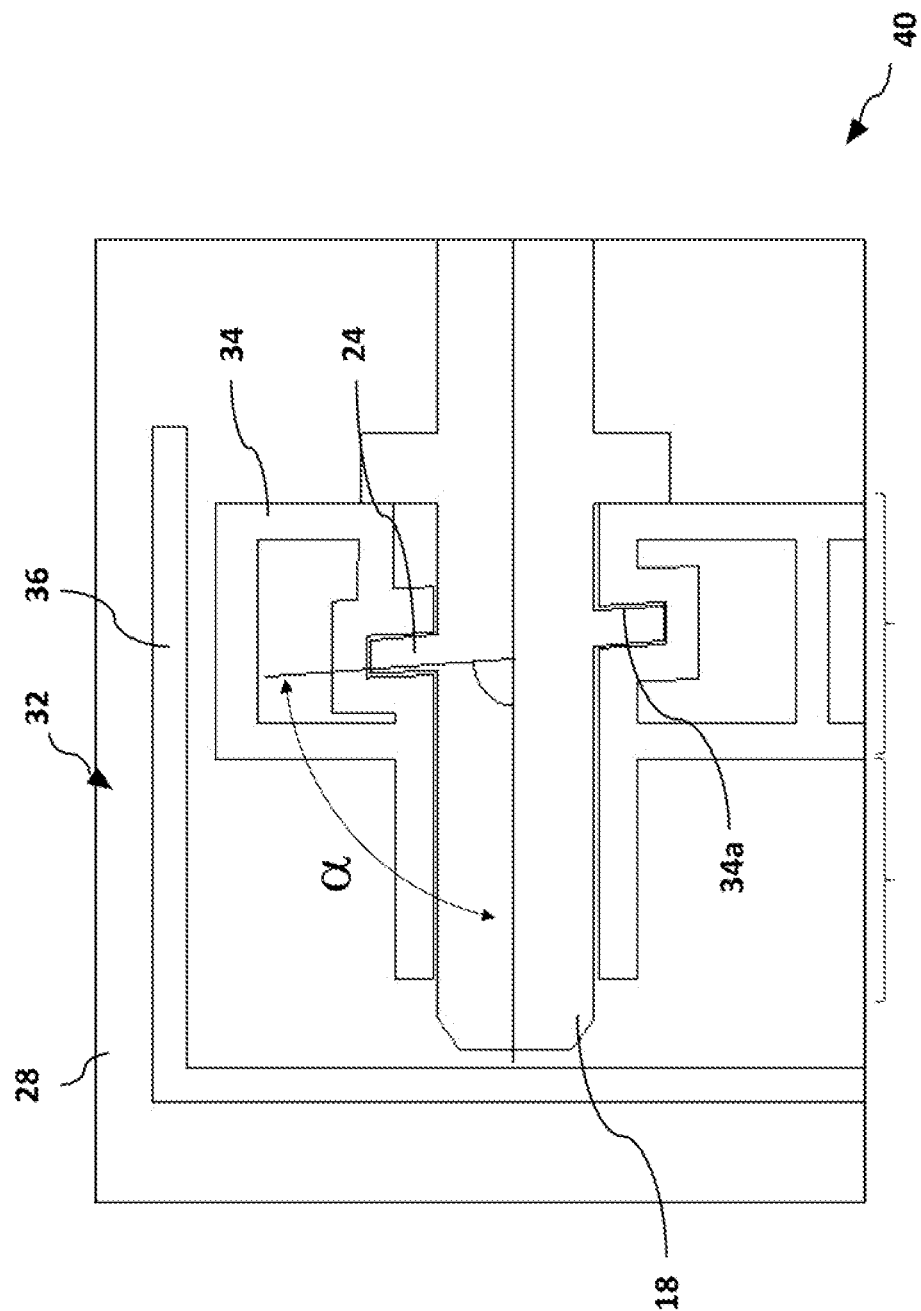
FIG. 5 is a schematic representation of a partial section of the air flap unit according to the invention as shown in FIG. 4 in an assembled state in a sectional view along section line I-I according to a first embodiment.

FIG. 5 shows a schematic representation of a partial section of the air flap unit 40 according to the invention as shown in FIG. 4 in an assembled state in a sectional view along sectional line I-I according to a first embodiment.

According to FIG. 5 it can be seen that the locking element 32 has an inner frame part 34 arranged within an outer frame part 36, in which the guide pin 18 can be received. For receiving purposes, the inner frame parts 34 presently have an internal thread 34a for correspondingly receiving an external thread 24 of the guide pin 18. As can be seen from FIG. 5, the detectable force F, which results at least in part from a direct interaction between the external thread 24 of the fastening section B of at least one air flap 6 and the corresponding internal thread 34a of the inner frame part 34, is dependent on the pitch angle α of the external thread 24.

Figure 6A:
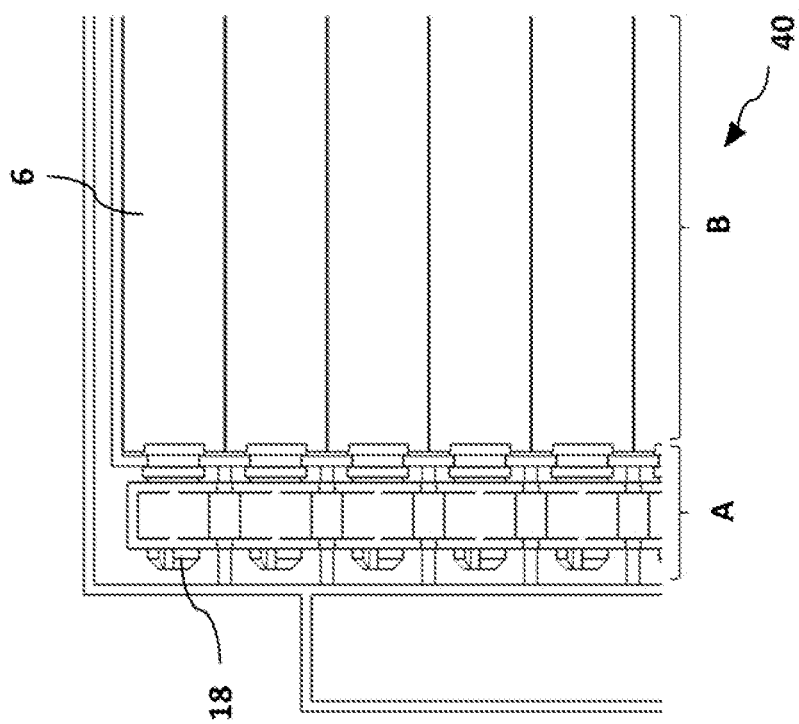
FIG. 6a is a schematic representation of a partial section of the air flap unit according to the invention as shown in FIG. 2 in a closed position with (right) and without (left) locking element according to a first embodiment.
Figure 6A:
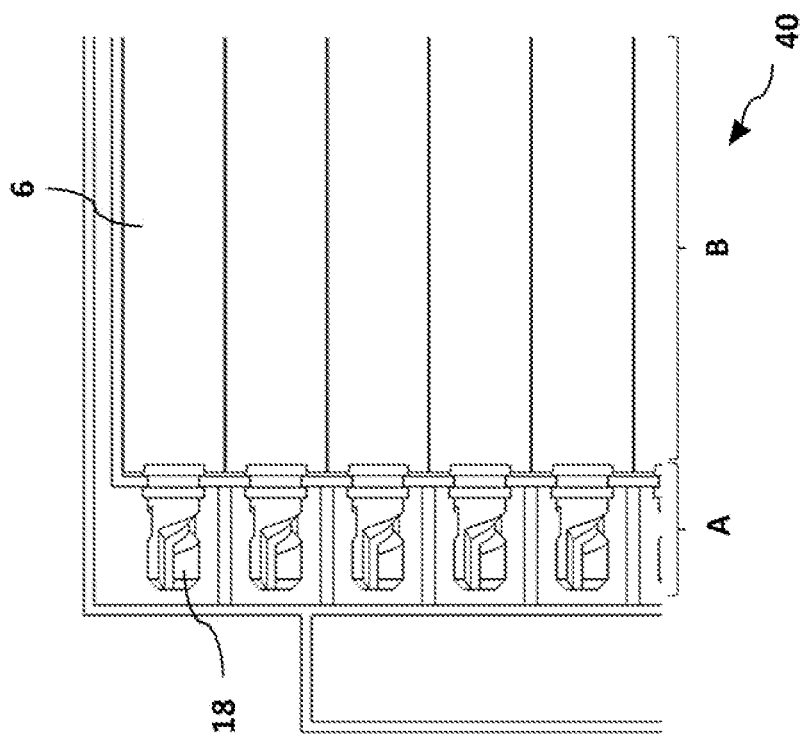

FIG. 6a shows a schematic representation of a partial section of the air flap unit 40 according to the invention as shown in FIG. 2 in a closed position with (right) and without (left) locking element in a top view according to a first embodiment.

Figure 6B:
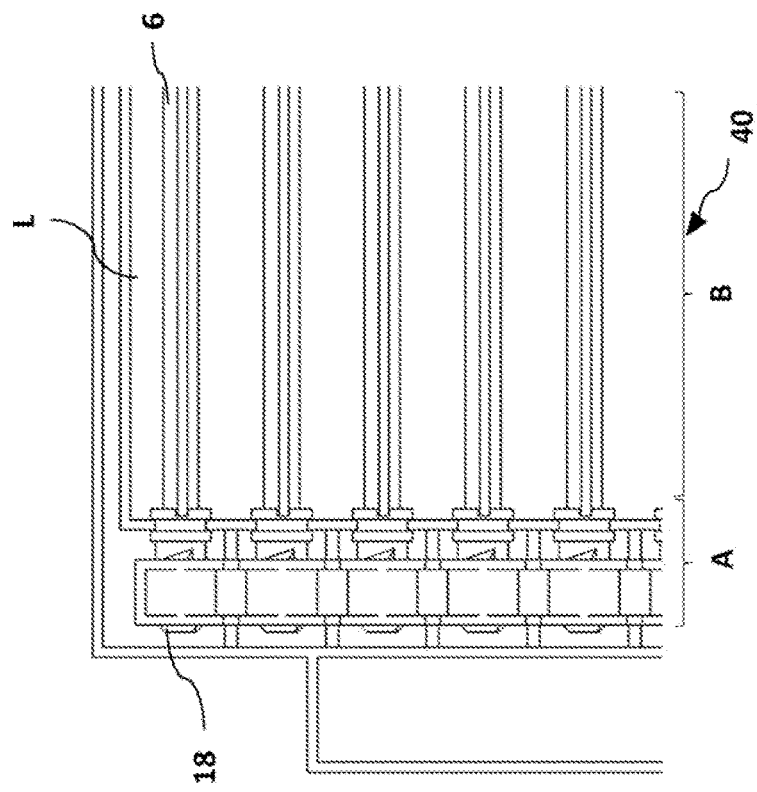
FIG. 6b is a schematic representation of a partial section of the air flap unit according to the invention as shown in FIG. 2 in an open position with (right) and without (left) locking element according to a first embodiment example.
Figure 6B:
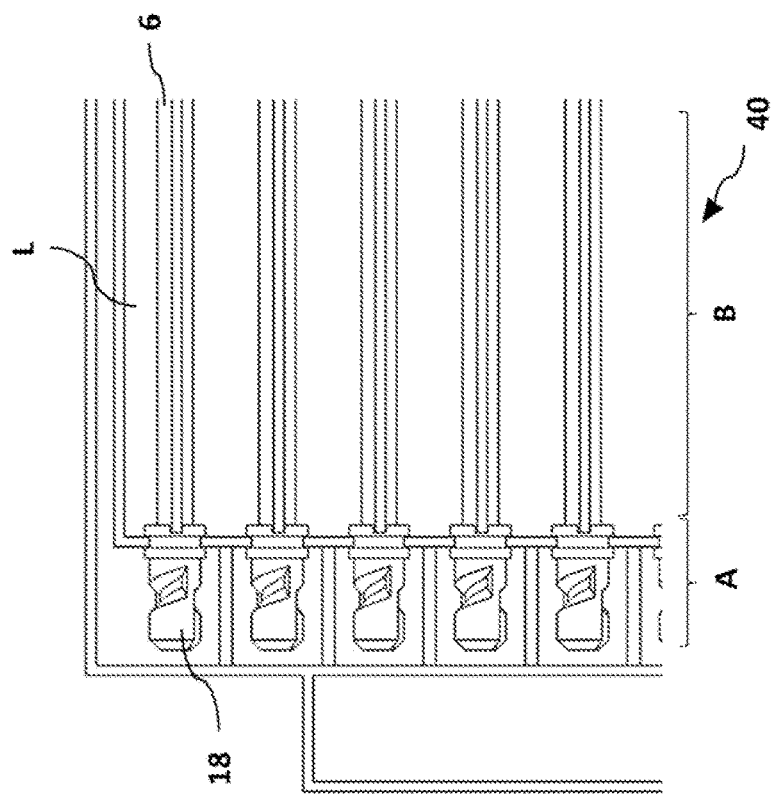

FIG. 6b shows a schematic representation of a partial section of the air flap unit 40 according to the invention as shown in FIG. 2 in an open position with (right) and without (left) locking element in a top view according to a first embodiment.

When comparing FIGS. 6a and 6b, it is noticeable that the air flap device 2 is configured in such a way that the air flaps 6 exert a simultaneous movement along the axis of rotation X during a movement from the closed position to the open position or vice versa, the generation of the detectable force F in the event of a malfunction or a non-function of an air flap 6 preferably resulting from a restricted mobility of at least one air flap 6 along the axis of rotation X.

Figure 6C:
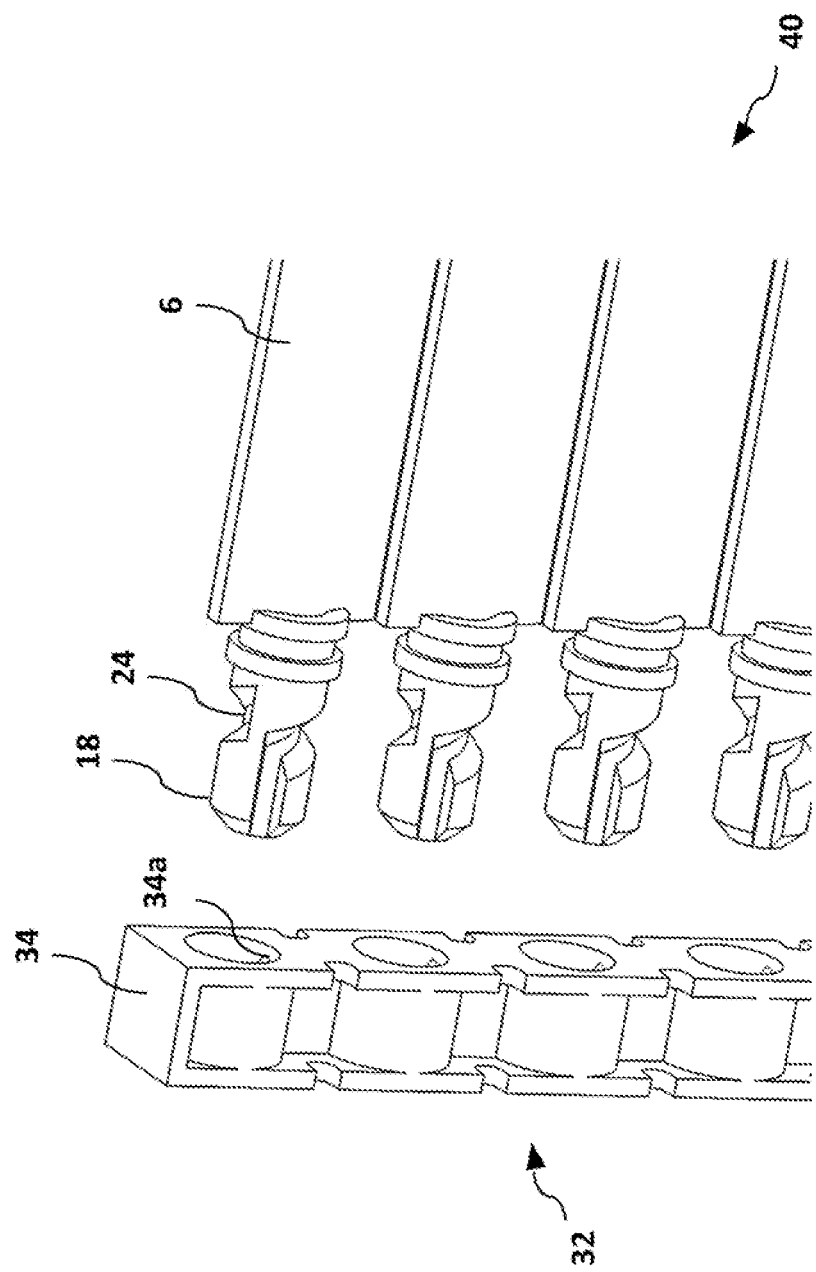
FIG. 6c is a schematic representation of a partial section of the air flap unit according to the invention as shown in FIG. 2 in an exploded view in a closed position according to a first embodiment.

FIG. 6c shows a schematic representation of a partial section of the air flap unit 40 according to the invention as shown in FIG. 2 in an exploded view in a closed position according to a first embodiment. Here, the guide pins 18 are configured in such a way that they can be positively inserted into the internal thread 34a of an internal frame part 34 of the locking element 32 via the external thread 24.

Figure 7:
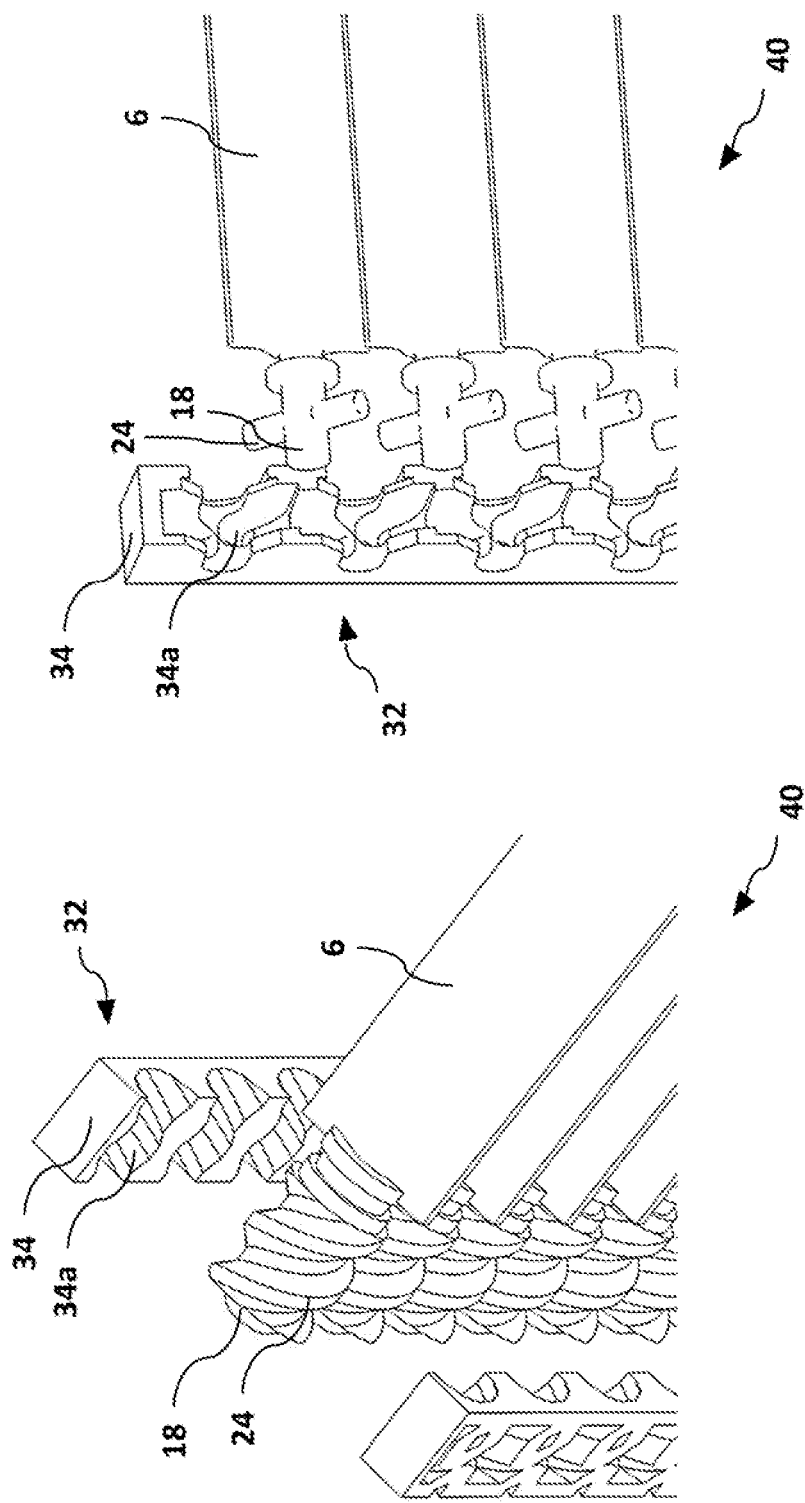
FIG. 7 is a schematic representation of a partial section of the air flap unit according to the invention as shown in FIG. 2 in an exploded view in an open position (left) and a closed position (right) according to a second (left) and a third (right) embodiment.

FIG. 7 shows a schematic representation of a partial section of the air flap unit according to the invention as shown in FIG. 2 in an exploded view in an open position (left) and a firing position (right) according to a second (left) and a third (right) embodiment.

As can be seen from FIG. 7, a large number of different embodiments of the fastening sections B, in particular of the guide pin 18 and external thread 24 as well as of the corresponding receiving sections of the inner frame part 34 of the locking element 32 are conceivable, via which in particular the magnitude of the detectable force F can be varied. For example, the guide pin 18 can have a continuous screw thread as external thread 24 (left) or a double rod-shaped thread (right) as external thread 24.

Figure 8:
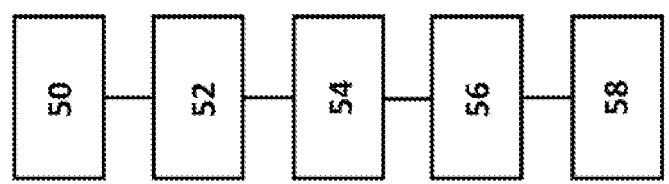
FIG. 8 is a schematic representation of the individual steps of a method according to the invention for controlling an air flap device of a motor vehicle.

FIG. 8 shows a schematic representation of the individual steps of a method according to the invention for controlling an air flap device of a motor vehicle.

Here, the method according to the invention comprises the steps of driving 50 an air flap device 2 from an open position to a closed position or vice versa, detecting 52 the force required for the movement during the movement to record a force-distance profile, comparing 54 the recorded force-distance profile with a reference profile, detecting 56 a malfunction or a non-function of an air flap 6 of the air flap device on the basis of a deviation between the recorded force-distance profile and the reference profile, and transmitting 58 a warning message to the motor vehicle.

By means of the air flap device 2 according to the invention, it is possible, in particular through the introduction of specifically configured fastening sections B of air flaps 6 and the introduction of a control element 10 with corresponding receiving sections 12 for receiving the fastening sections B, to enable reliable detection of a malfunction or non-function of even a single air flap 6 of an air flap device 2 for use in a motor vehicle in a structurally simple manner. The detection enables an early warning, which is already required by the authorities in many states, to be given to the driver of the motor vehicle, who can then initiate appropriate measures to rectify the damage as quickly as possible. In particular, this minimizes the distance a vehicle has to travel with increased fuel consumption, thus protecting the environment. Due to the variety of possible designs of the fastening sections B of the air flaps 6 or of the corresponding receiving sections 12 of the control unit 10, it is also possible to individually adapt the detectable force F via which a malfunction or non-function of an air flap 6 is registered to the corresponding air flap device 2.

LIST OF REFERENCE SIGNS

2 Air flap device
6 Air flaps
8 Drive unit
10 Control unit
12 Receiving section
12.1 Receiving section to accommodate the front parts of the guiding pins
12.2 Receiving section to accommodate the rear parts of the guiding pins
14 Lamella
14.1 first lamella section
14.2 second slat section
16 Lamellae carrier
18 Guiding pin
24 External thread
25 Acess opening
26 Base unit
28 outer frame element
30 Guiding element
32 Locking element
34 inner frame parts
34a inner thread
36 outer frame part
38 Coupling unit/element
40 Air flap unit
X axis of rotation
A cover section
B Fastening section
F Detectable force
K Coupling section
50 Driving an air flap device
52 detecting the force required for the movement
54 Comparing the recorded force-path profile
56 Detecting a malfunction or a non-function of an air flap
58 Sending out a warning message Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An air flap device for use in a motor vehicle, having an air flap unit comprising:
    a plurality of air flaps pivotally mounted about an axis of rotation between a closed position and an open position, wherein the air flaps each have a cover section for covering and uncovering air passages and a fastening section for mounting the air flaps in the air flap device,
    a drive unit for driving the air flaps, and
    a control unit fir controlling an operability of the air flaps, wherein the control unit has corresponding receiving sections for receiving the fastening sections of individual air flaps,
    wherein the air flap device is configured in such a way that, in an event of a malfunction or non-function of an air flap, a detectable force is generated, the detectable force resulting from a direct interaction between the fastening section of at least one air flap and the corresponding receiving section of the air flap in the control unit, wherein the air flap device is configured in such a way that the air flaps exert a simultaneous compound movement comprising a translation movement along the axis of rotation during a simultaneous rotational movement from the closed position into the open position or vice versa.

2. The air flap device according to claim 1, wherein the detectable force can be detected by means of the drive unit.

3. The air flap device according to claim 1, wherein the cover section of the air flaps has a lamella and a lamella carrier.

4. The air flap device according to claim 1, wherein the fastening section has a guide pin for insertion into an inlet opening of the control unit.

5. The air flap device according to claim 4, wherein the guide pin has a profiled surface.

6. The air flap device according to claim 5, wherein the profiled surface being in the form of an external thread, the external thread is in the form of one of the following thread types: trapezoidal thread, fine thread, pointed thread, Whitworth thread, saw thread, round thread, flat thread, left-hand, thread, UNC thread or UNF thread.

7. The air flap device according to claim 1, wherein the control unit is of multipart design.

8. The air flap device according to claim 5, wherein the control unit includes a base unit having a guide element with receiving sections for receiving the front parts of the guide pins of the air flaps.

9. The air flap device according to claim 8, wherein the base unit has a locking element with receiving sections for receiving the rear parts of the guide pins of the air flaps.

10. The air flap device according to claim 8, wherein the locking element has a plurality of inner frame parts for receiving the profiled surface of the guide pins.

11. The air flap device according to claim 10, wherein the locking element has a plurality of outer frame parts for receiving the inner frame parts.

12. The air flap device according to claim 1, wherein the detectable force results at least partially from a direct interaction between an external thread of the fastening section of at least one air flap and a corresponding internal thread of an internal frame part.

13. The air flap device according to claim 8, wherein the detectable force results at least partially from a direct interaction between a receiving section of the guide element and a front part of the guide pin.

14. The air flap device according to claim 1, wherein the detectable force results at least partially from a direct interaction between at least one inner frame part and an outer frame part.

15. The air flap device according to claim 9, wherein the magnitude of the detectable force can be varied at least via the type of thread form of the external thread of the guide pin or the lead angle of the external thread or the diameter of the guide pin.

16. The air flap device according to claim 1, wherein the air flaps each have a coupling section for coupling to a coupling element.

17. A method for controlling an air flap device of a motor vehicle, comprising:
   driving an air flap device around an axis of rotation from an open position to a closed position or vice versa, during a simultaneous movement of the air flap device comprising a translation movement along the axis of rotation,
   detecting the force required for movement during motion to record a force-distance profile,
   comparing the recorded force-distance profile with a reference profile,
   detecting a malfunction or a non-function of an air flap of the air flap device based on a deviation between the recorded force-distance profile and the reference profile, and
   transmitting a warning message to the motor vehicle.

18. The method of claim 17, wherein when comparing the recorded force-distance profile with the reference profile, a deviation between the recorded force-distance profile and the reference profile of at least 2/10 of the reference profile is detected.

19. A motor vehicle comprising:
   an air flap having an air flap unit comprising:
      a plurality of air flaps pivotally mounted about an axis of rotation between a closed position and an open position, wherein the air flaps each have a cover section for covering and uncovering air passages and a fastening section for mounting the air flaps in the air flap device,
      a drive unit for driving the air flaps, and
      a control unit for controlling an operability of the air flaps, wherein the control unit has corresponding receiving sections for receiving the fastening sections of individual air flaps,
   wherein the air flap device is configured in such a way that, in an event of a malfunction or non-function of an air flap, a detectable force is generated, the detectable force resulting from a direct interaction between the fastening section of at least one air flap and the corresponding receiving section of the air flap in the control unit, wherein the air flap device is configured in such a way that the air flaps exert a simultaneous compound movement comprising a translation movement along the axis of rotation during a simultaneous rotational movement from the closed position into the open position or vice versa.

* * * * *